Aug. 10, 1948.  C. E. MILNER  2,446,714
VALVE
Filed Nov. 27, 1944

Inventor
C. E. Milner
By Glascock Downing Tucker
Attys.

Patented Aug. 10, 1948

2,446,714

UNITED STATES PATENT OFFICE 2,446,714

VALVE

Charles Eric Milner, Birmingham, England

Application November 27, 1944, Serial No. 565,267
In Great Britain December 16, 1943

2 Claims. (Cl. 137—144)

This invention relates to valves of the kind operable by a hand lever for controlling the flow of air or other gases, and particularly to valves for controlling the supply of compressed air to pneumatically actuated jigs used in manufacturing operations. One form of such a valve is provided with spring-loaded (inlet and outlet) closure members of the poppet or like type, and a hand lever for actuating the said members. For securing the valve in the open condition a spring-loaded catch is ordinarily employed in association with the hand lever. When the valve is actuated very many times during the course of a working day, it has been found that relatively rapid wear of the catch occurs, and this not only necessitates frequent renewal of the catch but may be accompanied by some risk of injury to the attendant.

The object of the present invention is to provide an improved retaining device which obviates the disadvantages of the usual catch.

Figure 1:
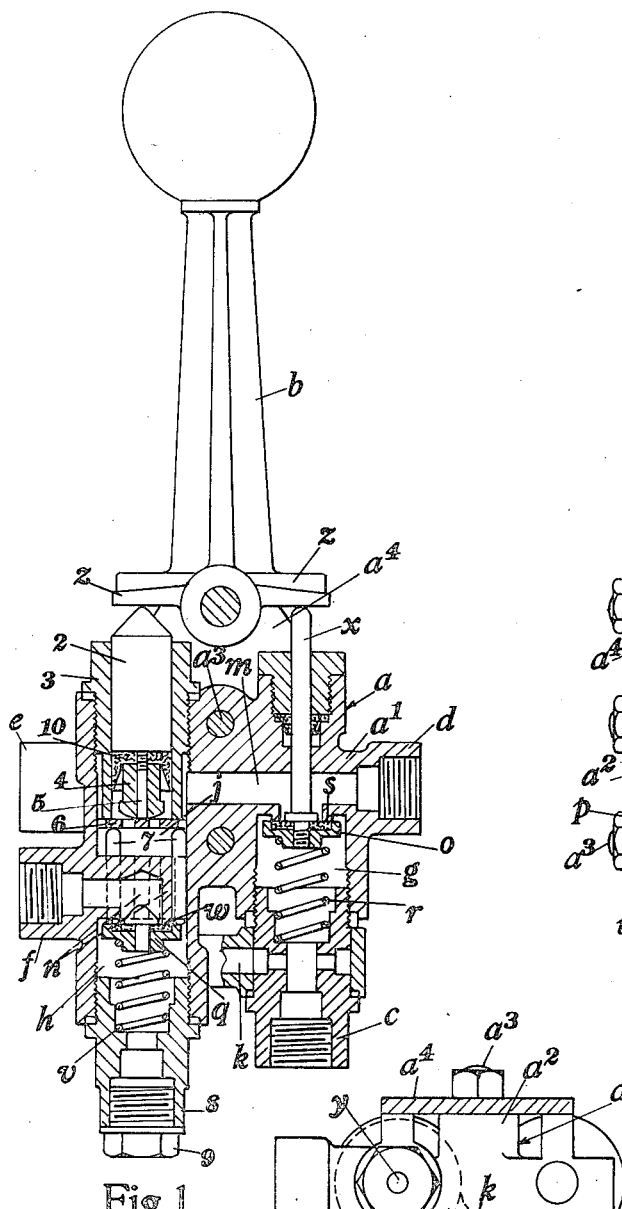
Figure 2:
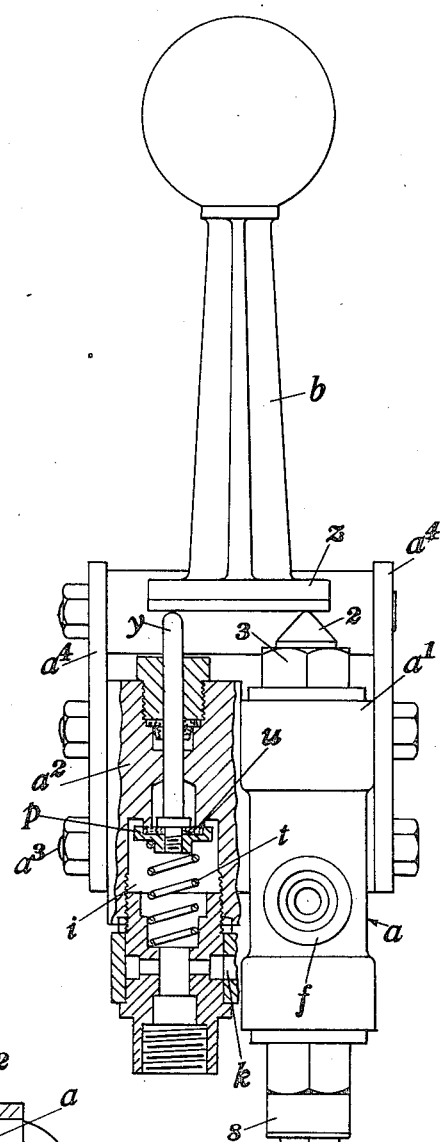
Figure 3:
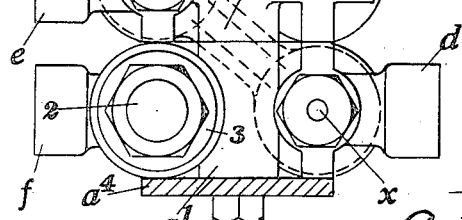

In the accompanying sheet of explanatory drawings:

Figure 1 is a sectional side elevation, Figure 2 a part sectional side elevation taken at right angles to Figure 1, and Figure 3 a part sectional plan, illustrating the invention applied to a valve for controlling the supply of compressed air to pneumatically operated jigs used in manufacturing operations.

In carrying the invention into effect as shown in the drawings, I employ a hollow body $a$ on one end of which is pivotally mounted a hand lever $b$, and which is provided with four pipe connections $c$, $d$, $e$, $f$. The body $a$ may conveniently be composed of a pair of parts $a^1$, $a^2$ secured together by bolts $a^3$ and side plates $a^4$, the latter serving to support the hand lever $b$. The connection $c$ serves as an inlet through which compressed air from any convenient source can be admitted to the interior of the body $a$. The connection $d$ serves as an outlet through which compressed air from the inlet connection $c$ can pass to the jig-actuating means. The connection $e$ serves as an outlet through which compressed air from the inlet connection $c$ can be delivered for discharging the work piece from the jig or for any other desired purpose. The connection $f$ serves as an outlet through which the jig-actuating air can be discharged for releasing the jig.

The interior of the hollow body $a$ is shaped to provide three cylindrical chambers $g$, $h$, $i$ situated parallel with each other, and another chamber $j$ situated coaxially with the chamber $h$. The inlet connection $c$ communicates with the chamber $g$ and also (through a passage $k$) with the chamber $i$. The outlet connection $d$ communicates through a passage $m$ in the body $a$ with the chamber $j$, and the latter is connected by additional passages $n$ in the body with the chamber $h$.

Arranged in the body $a$ are two closure members $o$, $p$ (herein termed inlet closure members) of the poppet or like type, and another closure member $q$ (herein termed the outlet closure member) of the same type. The inlet closure member $o$ is loaded by a spring $r$ and serves by co-operation with a seating $s$ to control communication between the chamber $g$ and the passage $m$ leading to the outlet connection $d$. The inlet closure member $p$ is loaded by a spring $t$ and serves by co-operation with a seating $u$ to control communication between the chamber $i$ and the outlet connection $e$. The outlet closure member $q$ is loaded by a spring $v$ and serves by co-operation with a seating $w$ to control communication between the chamber $h$ and the outlet connection $f$.

The inlet closure members $o$, $p$ are respectively provided with operating stems $x$, $y$ which extend through the body $a$ at positions adjacent to but on opposite sides of the pivot axis of the hand lever $b$, and the latter has formed on or secured to its pivoted end lateral projections $z$ adapted to act on the adjacent operating stems.

The outlet closure member $q$ is operable by a plunger 2 which is slidably supported by a bush 3 screwed into the outer end of the chamber $j$, and which projects from the body $a$ at a position spaced from but at the same side of the pivot axis of the hand lever $b$ as the operating stem $y$ of the closure member $p$, so that the plunger can be actuated by the adjacent lateral projection $z$ on the lever. Inward movement of the plunger 2 under the action of the hand lever $b$ is transmitted to the outlet closure member $q$ through a nut 4 on a stem 5 extending from the rear of the plunger, a perforated abutment piece 6 slidable in the chamber $j$, and thrust pieces 7 slidably supported by and passing through the portion of the body $a$ between the chambers $h$, $j$. A cup leather 10 is secured by the nut 4 to the rear end of the plunger 2 for preventing fluid leakage from the chamber $j$ through the bush 3.

When the hand lever $b$ is moved to one side of its normal central position it opens the inlet closure member $o$ for allowing compressed air from the inlet connection $c$ to enter the passage $m$. From this passage the compressed air can pass through the outlet connection $d$ to the jig-actuating means and can also enter the chambers $j$, $h$. The compressed air in the chamber $j$ acts on the inner end of the plunger 2, causing the outer end of the plunger to press against the adjacent lateral extension $z$ on the hand lever $b$ for holding the latter in the position to which it has been moved. The pressure thus exerted by the plunger 2 on the hand lever $b$ is sufficient to hold the latter securely against accidental movement, but is insufficient to prevent intentional movement of the hand lever by the user in the opposite direction. On moving the hand lever $b$ from this position to the other side of its normal central position the inlet closure member $o$ closes under the action of its spring $r$, the plunger 2 is actuated to open the outlet closure member $q$ for allowing the air from the jig-operating means and the chambers $j$, $h$ to be released through the outlet connection $f$, and the other inlet closure member $p$ is opened to allow compressed air from the inlet connection $c$ to pass through the outlet connection $e$ for discharging the work piece from the jig or for any other desired purpose.

In the example shown the body $a$ is provided with another pipe connection 8 adapted to communicate with the chamber $h$. When the outlet connection $d$ is in use the pipe connection 8 is closed by a plug 9. But, if desired, the outlet connection $d$ may be closed by a plug, and the connection 8 used as the outlet through which compressed air from the inlet connection $c$ can pass to the jig-actuating means.

By this invention I am able in a very simple manner to obviate the disadvantages of the spring catch usually employed in association with the hand lever. The invention is not, however, restricted to the example above described, as it may be applied to other forms of valves, and subordinate details may be varied to suit different requirements.

Having thus described my invention what I claim as new and desire to secure by Letters Patent is:

1. A valve of the kind specified, having in combination with a hollow body having a fluid inlet and outlets, a hand lever mounted on the body, a closure member operable by movement of the hand lever in one direction for establishing communication between the inlet and one of the outlets, a plunger operable by fluid pressure under the control of the said closure member for preventing unintentional return movement of the hand lever, and another closure member arranged coaxially with the plunger and operable through the medium of the latter by movement of the hand lever in the opposite direction for establishing communication between the last mentioned outlet and another of the said outlets.

2. A valve of the kind specified having in combination a hollow body provided with a fluid inlet and outlets and with passageways leading to the inlet and outlets, a hand lever mounted on the body, a closure member movable to an open position by movement of the hand lever in one direction for establishing communication between the passageways leading to the inlet and one of the outlets, a spring biassing the closure member to a closed position, a plunger arranged to act on the hand lever and operable by the fluid pressure under the control of the said closure member for holding the hand lever against unintentional return movement, another closure member movable to the open position through the medium of the plunger by movement of the hand lever in the opposite direction for establishing communication between the passageways leading to the last mentioned outlet and another of the said outlets, and a spring biassing the last mentioned closure member to a closed position.

CHARLES ERIC MILNER.

REFERENCES CITED

The following references are of record in the file of this patent:

UNITED STATES PATENTS

| Number | Name | Date |
| --- | --- | --- |
| 1,666,478 | Supplee | Apr. 17, 1928 |
| 1,775,427 | Gregoire | Sept. 9, 1930 |
| 1,965,237 | Hawkins | July 3, 1934 |
| 1,984,828 | Fornwalt | Dec. 18, 1934 |
| 2,126,101 | Fornwalt | Aug. 9, 1938 |
| 2,151,563 | Platz | Mar. 21, 1939 |
| 2,313,843 | Shaff | Mar. 16, 1943 |
| 2,332,882 | Abbatielo | Oct. 26, 1943 |

FOREIGN PATENTS

| Number | Country | Date |
| --- | --- | --- |
| 103,909 | Great Britain | Feb. 15, 1917 |